Nov. 1, 1949  G. PELIKAN ET AL  2,486,975

DRAFT GEAR

Filed Jan. 16, 1948

INVENTORS
George R. Munro
George Pelikan
BY
Pennie, Edmonds,
Morton and Barrows
ATTORNEYS Patented Nov. 1, 1949

2,486,975

UNITED STATES PATENT OFFICE 2,486,975

DRAFT GEAR

George Pelikan, Brooklyn, and George R. Munro, Massapequa, N. Y., assignors to Waugh Equipment Company, New York, N. Y., a corporation of Maine Application January 16, 1948, Serial No. 2,583

7 Claims. (Cl. 213—46)

1

This invention relates to draft gears for railway rolling stock and is concerned more particularly with a novel draft gear, which is of simple construction, includes no parts generating friction and thus subject to wear, and can be easily installed in the usual draft pocket on the gear. The gear never goes solid and, upon its installation, there is no slack in the connections between the coupler and the vehicle body. Accordingly, the gear becomes effective, as soon as the coupler yoke begins to move in a given direction, and it is continuously effective throughout such movement.

The gear of the invention includes a central spring unit, and outer spring units of like capacity at opposite ends thereof. The outer spring units are of greater capacity than the central spring unit and preferably all of the units include rubber springs. Abutment means in the form of central followers are interposed between the central spring unit and each outer spring unit and each central follower has longitudinal extensions, which engage a pair of stops on the car body. The central followers are so constructed that they partially overlap the central spring unit, and, at the outer end of each outer spring unit, there is an end follower bearing against the adjacent end of the yoke. When a force is applied to the coupler and the coupler yoke is moved, such movement is initially resisted by one of the outer spring units and the central spring unit, until the central followers engage and further compression of the central spring unit is prevented. Thereafter, further movement of the yoke is resisted by an outer spring unit alone.

For a better understanding of the invention, reference may be had to the accompanying drawing, in which Fig. 1 is a longitudinal vertical sectional view on the line 1—1 of Fig. 4, through the new draft gear installed in a yoke in a draft pocket;

Figure 1:
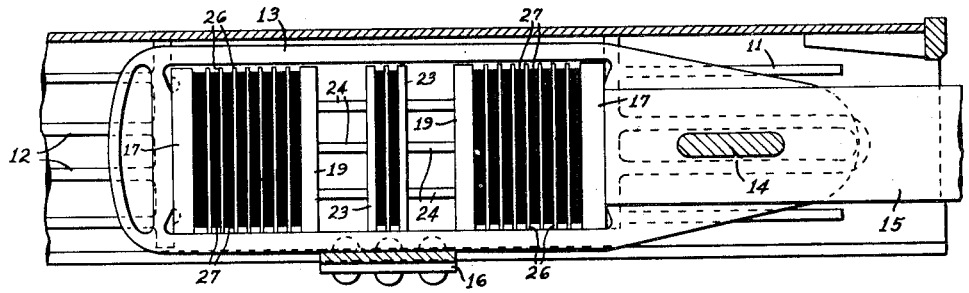

The new gear is illustrated installed in a draft pocket between the longitudinal sills 10 of a railway vehicle, the sills being provided with front stops 11 and rear stops 12 at opposite ends of the pocket. The draft gear is mounted transversely within a yoke 13, the forward end of which is connected by a key 14 to the shank 15 of a coupler.

2

The yoke is supported on a carry iron 16 across the sills and connected to the lower edges thereof.

Figure 2:
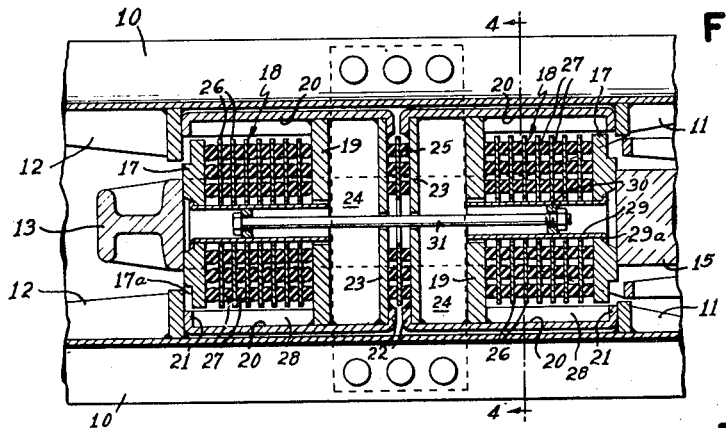
Fig. 2 is a sectional view on the line 2—2 of Fig. 4.
Figure 3:
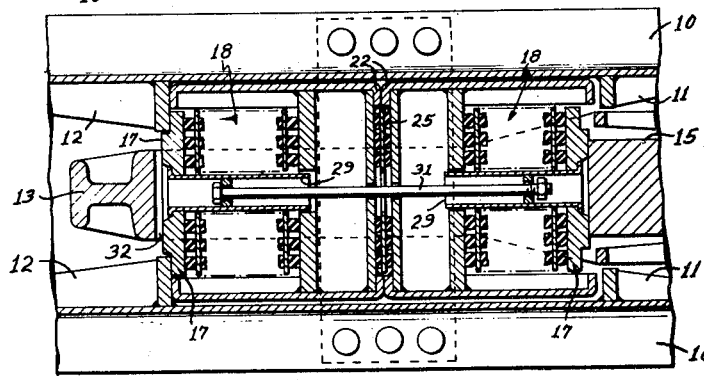
Fig. 3 is a view similar to Fig. 2, but showing the gear with the parts in the positions that they assume when the coupler yoke is moved by a force in buff.
Figure 4:
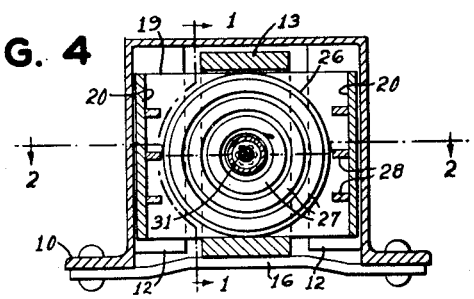
Fig. 4 is a sectional view on the line 4—4 of Fig. 2.

The gear includes a pair of end followers 17, which lie in contact with the inner faces of the ends of the yoke and are wider than the distance between opposed pairs of stops 11 or 12. The end followers have notched corners 17a in their outer faces and are normally out of contact with the adjacent stops. A pair of outer spring units 18 engage the inner faces of the respective end followers and the inner ends of the spring units 18 bear against the outer faces of respective central followers, which are assembled of a number of parts. Each central follower comprises a plate 19 lying between and connected to a pair of longitudinally extending plates 20. Each plate 20 is of channel section and one leg 21 thereof bears against the inner face of one of the stops 11, 12. The legs 22 at the other ends of plates 20 of each central follower are connected by a plate 23 lying between the legs and the plate 19 of the follower. Horizontal plates 24 lie between and are connected to each plate 19 and its associated plate 23. The opposed faces of plates 23 of the two central followers form opposite walls of a pocket, within which is a central spring unit 25. Normally, the adjacent legs 22 on the plates 20 of the two central followers are spaced apart, as shown in Fig. 2.

The central and outer spring units are made of rubber springs, each of which is made up of a metal plate 26 having rubber members 27 on opposite faces thereof. In the construction illustrated, the metal plate 26 is circular and the rubber members have the form of concentric rings. Each spring unit 18 is illustrated as including four rubber springs with adjacent springs separated by divider plates, while the central unit 25 comprises a single spring. A plurality of horizontal plates 28 are mounted on the inner face of each plate 20 and bear against the associated plate 19 and the leg 21 at the outer end of plate 20.

The end followers, central followers, rubber springs, and divider plates have aligned central openings, and a tube 29 passes through the openings through each end follower 17 and the springs and divider plates of the adjacent outer spring unit 18 and into the opening of plate 19 of the associated central follower. Each tube has an outer peripheral flange 29a overlying a part of the end follower, through which it passes. A plate 30 is mounted fast in each tube between the ends thereof, the plates 30 having central openings through which extends a tie bolt 31. The head on the bolt bears against the outer face of one plate 30 and the nut on the other end of the bolt bears against the outer face of the other plate 30.

When the gear is to be installed, the nut on bolt 31 is drawn up so as to pull the end followers 17 toward one another until the total length of the assembly is slightly less than the distance between the opposite inner faces at the ends of the yoke. The gear assembly is then installed in the yoke and the yoke is placed in position with the end followers 17 of the gear lying between stops 11, 12. Thereafter, the carry iron 16 is mounted in place to support the gear and yoke. In order that the gear assembly may, after installation, make tight contact with the ends of the yoke, a washer of U-shape is placed beneath the head or the nut on the bolt with its radial opening extending upwardly, the washer being held in place against a plate 30, when the nut on the bolt is drawn up. During the use of the gear, the washer will drop off the bolt and permit the gear assembly to expand into tight contact with the yoke.

In the operation of the gear, the application of a force, for example, in buff, to the coupler causes yoke 13 to move to the rear and the initial part of such movement is resisted partly by the forward outer spring unit 18 and partly by the central spring unit 25. As the two units are compressed, the forward central follower moves to the rear and, since spring unit 25 is of smaller capacity than the outer spring unit 18, the legs 22 on the forward central follower will quickly engage the corresponding legs on the rear central follower, after which the forward central follower is held against further movement. Further rearward movement of the yoke is then resisted by the front outer spring unit alone, since the engagement of the two central followers prevents further compression of the central spring unit.

When a force in draft is applied to the coupler, an action, which is the reverse of that described, takes place. The initial forward movement of the yoke is resisted in part by the rear outer spring unit and in part by the central spring unit, such resistance continuing until the rear central follower has engaged and is held stationary by the front central follower. Thereafter, further forward movement of the yoke is resisted by the rear outer spring unit alone and the central spring unit is protected against further compression.

The overall length of the gear assembly is preferably slightly greater, when the springs are in unloaded condition, than the distance between the inner faces of the ends of the yoke. Whenever a force, for example, in buff, is applied to the coupler and the yoke moves inwardly, the forward end follower 17 is moved inwardly so that plate 30 within the tube 29 of the end follower moves away from the head or nut on the bolt and the washer drops off the bolt. As the yoke moves inwardly, the inward movement of the forward tube 30 causes the bolt to release the rear outer spring unit 18 and that unit expands slightly, until the rear end follower engages the stops 12. If a further inward movement of the yoke occurs, a gap indicated at 32 is opened up at between the rear end of the yoke and the rear end follower 17. When the force applied to the coupler is released, the compressed forward outer spring unit 18 and central unit 25 expand, advancing the yoke until its rear end engages the rear end follower 17. As the two outer spring units 18 are of like capacity, the yoke becomes centralized with its opposite inner faces engaging the end followers 17 at opposite ends of the gear.

With the construction described, the initial movement of the yoke in either direction is mainly against the resistance of the central spring unit, because the capacity of that unit is lower than that of either outer spring unit. The gear, accordingly, has a soft initial action, until the central followers come into contact, after which the cushioning effect is provided entirely by one of the outer spring units, depending upon the direction of movement of the yoke. The major cushioning effect is thus provided by the outer spring units, which operate in alternation to resist forces in buff and draft, respectively. Because of the alternate use of the two major cushioning elements of the gear, the springs therein function only part of the time and their life is correspondingly increased.

In the construction illustrated and described, each outer spring unit is made up of four rubber springs with divider plates and the central spring unit consists of a single spring. It will be understood, of course, that different numbers of springs may be used in the spring units and the number to be employed will depend on the characteristics of the individual springs and the service in which the gear is to be used.

We claim:

1. A draft gear for use within a yoke in a draft pocket having a pair of front stops and a pair of rear stops, which comprises a front central follower having extensions adapted to engage the front stops, a rear central follower having extensions adapted to engage the rear stops, a central spring unit of relatively small capacity between and in engagement with the central followers, and an outer spring unit of relatively large capacity in contact with the outer side of each central follower and adapted to act on the adjacent end of the yoke.

2. A draft gear for use within a yoke in a draft pocket having a pair of front stops and a pair of rear stops, which comprises a front central follower having extensions adapted to engage the front stops, a rear central follower having extensions adapted to engage the rear stops, a central spring unit of relatively small capacity between and in engagement with the central followers, normally spaced opposed means on the central followers engageable to limit the compression of the central spring unit, and an outer spring unit of relatively large capacity in contact with the outer side of each central follower and adapted to act on the adjacent end of the yoke.

3. A draft gear for use within a yoke in a draft pocket having a pair of front stops and a pair of rear stops, which comprises a front central follower having extensions adapted to engage the front stops, a rear central follower having extensions adapted to engage the rear stops, an inner rubber spring unit between and in engagement with the central followers, and an outer group of rubber springs in contact with the outer side of each central follower and adapted to act on the adjacent end of the yoke, the outer groups of rubber springs being of greater capacity than the inner unit.

4. A draft gear for use within a yoke in a draft pocket having a pair of front stops and a pair of rear stops, which comprises a front central follower having extensions adapted to lie longitudinally within the pocket and engage the front stops, a rear central follower having extensions adapted to lie longitudinally within the pocket and engage the rear stops, the followers having cooperating members on their opposed faces defining a central pocket, a central spring unit of relatively small capacity within the central pocket and engaging the central followers, said cooperating members being adapted to engage to limit the compression of the central spring unit, and an outer spring unit of relatively large capacity in contact with the outer side of each central follower and adapted to act on the adjacent end of the yoke.

5. A draft gear for use within a yoke in a draft pocket having a pair of front stops and a pair of rear stops, which comprises a front central follower and a rear central follower adapted to be mounted in the draft pocket to lie transversely thereof, each central follower having extensions at its ends adapted to lie parallel to the walls of the draft pocket, the extensions on the front and rear central followers engaging the front and rear stops, respectively, members on the inner sides of the central followers cooperating to form a central pocket, a central spring unit of relatively small capacity within the central pocket and engaging opposed surfaces of the central followers, said members being adapted to engage to limit the compression of the central spring unit, an outer spring unit of relatively large capacity engaging the outer side of each central follower, the outer spring units being alike, and an outer follower at the outer end of each outer spring unit and engaged thereby, each outer follower being adapted to engage the adjacent end of the yoke.

6. In a draft gear for use in a draft pocket having a front pair of stops and a rear pair of stops, the combination with a yoke, of a front central follower and a rear central follower lying within the yoke transversely thereof, each central follower having outward extensions adapted to lie longitudinally of the draft pocket, the extensions on the front and rear central followers being adapted to engage the front and rear stops, respectively, a central spring unit between and in engagement with the central followers, cooperating means on the central followers for limiting the compression of the central spring unit, an outer spring unit outside each central follower and in engagement therewith, and an end follower at the outer end of each outer spring unit, each end follower being engaged by said outer spring unit and normally engaging the adjacent end of the yoke.

7. A draft gear for use within a yoke in a draft pocket having a pair of front stops and a pair of rear stops, which comprises a central spring unit, a pair of outer spring units lying at opposite ends of the central unit and adapted to be compressed alternately by the yoke, when the latter is subjected to forces in buff and draft, front and rear abutment means, the front abutment means lying between and in engagement with one end of the central spring unit and the adjacent end of the front outer spring unit and the rear abutment means lying between and in engagement with the other end of the central spring unit and the adjacent end of the rear outer spring unit, the front and rear abutment means having parts normally engaging the front and rear stops, respectively, and being movable inwardly away from their respective stops against the resistance of the central spring unit, said abutment means having engageable parts limiting the compression of the central spring unit, and a member engaging the outer end of each outer spring unit and adapted to be engaged by the adjacent end of the yoke and moved thereby initially against the resistance of its outer spring unit and the central spring unit and thereafter against the resistance of its outer spring unit only.

GEORGE PELIKAN.
GEORGE R. MUNRO.

No references cited.